(12) United States Patent
Müller et al.

(10) Patent No.: US 9,922,735 B2
(45) Date of Patent: Mar. 20, 2018

(54) DEVICE FOR CLOSING A DRIVE CASING PIPE

(71) Applicant: AREVA GmbH, Erlangen (DE)

(72) Inventors: Erhard Müller, Pretzfeldt (DE); Paul Huprich, Neunkirchen am Brand (DE); Arne Brockmöller-Meiners, Rickling (DE)

(73) Assignee: AREVA GMBH, Erlangen (DE)

( * ) Notice: Subject to any disclaimer, the term of this patent is extended or adjusted under 35 U.S.C. 154(b) by 256 days.

(21) Appl. No.: 14/427,245

(22) PCT Filed: Aug. 9, 2013

(86) PCT No.: PCT/EP2013/066721
§ 371 (c)(1),
(2) Date: Mar. 10, 2015

(87) PCT Pub. No.: WO2014/044468
PCT Pub. Date: Mar. 27, 2014

(65) Prior Publication Data
US 2015/0243381 A1    Aug. 27, 2015

(30) Foreign Application Priority Data
Sep. 19, 2012   (DE) .................. 10 2012 216 833

(51) Int. Cl.
*G21C 13/067*   (2006.01)
*G21C 7/12*     (2006.01)

(52) U.S. Cl.
CPC .......... *G21C 13/0675* (2013.01); *G21C 7/12* (2013.01); *G21C 13/067* (2013.01); *Y02E 30/31* (2013.01); *Y02E 30/39* (2013.01)

(58) Field of Classification Search
CPC .. G21C 13/028; G21C 13/032; G21C 13/036; G21C 13/06; G21C 13/067; G21C 13/0675

See application file for complete search history.

(56) References Cited

U.S. PATENT DOCUMENTS 5,227,124 A * 7/1993 Saito ................... G21C 13/02
228/107
2006/0138139 A1 6/2006 Keller
2011/0274229 A1* 11/2011 Hamamoto .......... G21C 13/036
376/203

FOREIGN PATENT DOCUMENTS

| DE | 911 565   | 5/1954  |
| DE | 1227741   | 10/1966 |
| DE | 1 971 125 U | 10/1967 |
| DE | 1 912 591 | 10/1969 |

(Continued)

*Primary Examiner* — Sharon M Davis
(74) *Attorney, Agent, or Firm* — Keller Jolley Preece (57) ABSTRACT

The invention relates to a device for closing a pipe opening, opening upwards, of a drive casing pipe accommodating the control rod drive of a boiling water reactor, said device comprising a closure plug with a plug housing, opening downwards, a sealing element guided axially so as to be movable within the plug housing, which element has a sealing face providing a sealing contact with an annular counter face defining the pipe opening, a locking element provided to fix the plug housing on the drive casing pipe, and a spring, which is supported by the upper end thereof on the plug housing and by the lower end thereof on the sealing element and holds said element in a lower end position.

17 Claims, 7 Drawing Sheets

(56) References Cited

FOREIGN PATENT DOCUMENTS

| | | |
|---|---|---|
| DE | 32 28 802 C2 | 2/1984 |
| DE | 689 10 221 T2 | 5/1994 |
| EP | 0 806 369 A1 | 11/1997 |
| FR | 2668215 | 4/1992 |
| GB | 14606 A | 0/1907 |
| GB | 722040 A | 1/1955 |
| GB | 1084319 A | 9/1967 |

\* cited by examiner

DEVICE FOR CLOSING A DRIVE CASING PIPE

CROSS-REFERENCE TO RELATED APPLICATIONS

This application is a national phase entry under 35 U.S.C. § 371 of International Application No. PCT/EP2013/066721, filed Aug. 9, 2013, which claims the benefit of German Application Nos. 10 2012 216 833.8, filed Sep. 19, 2012. The entire contents of each of the foregoing patent applications are hereby incorporated by reference.

BACKGROUND OF THE INVENTION

1. Field of the Invention

The invention relates to a device for closing a drive casing pipe. Said device comprises a closing plug which serves for closing an upwardly issuing pipe orifice of the pipe, of the drive casing pipe, which receives a control rod drive of a boiling water reactor. Control rods serve for controlling or regulating the chain reactions taking place in the fuel elements of the reactor pressure vessel, and, depending on how far they are moved into the reactor pressure vessel, they absorb to a greater or lesser extent neutrons which are released during the chain reaction.

2. Background and Relevant Art

In boiling water reactors, the control rods are moved from below into the reactor core which comprises a multiplicity of fuel elements. The motors required for moving in the control rods are located in a space present underneath a reactor pressure vessel, an approximately stick-shaped control rod carrier being movable vertically in a known way in the drive casing pipe which is led with its upper end through the bottom of the reactor pressure vessel. The drive technology referred to here is known, and therefore more detailed particulars regarding this may be dispensed with.

If fuel elements, control rods and control rod guide pipes, in which the control rods are guided axially movably, are removed from the reactor pressure vessel, for example in the event of the dismantling of a power station, the drive casing pipe is upwardly open, that is to say it issues with a pipe orifice into the inner space of the reactor pressure vessel. In order to prevent a leakage of primary coolant in the event of demounting or repair of the drive systems located underneath the reactor pressure vessel, closure of said pipe orifice is required.

The object of the invention is to propose a device, by means of which a drive casing pipe can be simply and reliably sealed off and the seal cancelled again.

BRIEF SUMMARY OF THE INVENTION

This object is achieved by means of a device as claimed in claim 1. The device comprises a closing plug with a downwardly open plug casing and a sealing element guided axially movably inside the plug casing. The sealing element has a sealing surface serving for sealing bearing contact against a ring-shaped countersurface bordering the upper pipe orifice of the drive casing pipe. Furthermore, the device comprises a locking element which serves for fixing the plug casing to the drive casing pipe. Finally, a spring is also present, which is supported with its upper end on the plug casing and with its lower end on the sealing element and at the same time holds the latter in a lower end position or loads it with a spring force in the direction of this end position.

A configuration of this kind makes it possible that the closing plug can be placed by means of a vertically downwardly directed feed movement onto the upper pipe end of the drive casing pipe and the plug casing can be fixed to the pipe end. On account of the resilient mounting of the sealing element, after the sealing element bears with its sealing surface against a countersurface of the drive casing pipe with the effect of a sealing pairing, the plug casing can also be moved further downwardly vertically until the sealing element is pressed with a stipulated force onto the countersurface. The locking element can then be activated and the closing plug fixed axially to the drive casing pipe.

Many different possibilities for technical implementation may be envisaged for the way in which the locking element can be brought into a position fixing into the pipe end. Preferably, however, the locking element is configured such that it is mounted on the plug casing rotatably with respect to the longitudinal mid-axis of the closing plug, specifically between a locking position, in which it is axially fixed actively to the pipe end, and a release position, in which the axial fixing is cancelled. As also stated further below, the rotatable mounting of the locking element makes it possible for reliable locking of the closing plug in its end position or mounting position to be carried out even from a long distance. Moreover, the locking the fixing of the closing plug can be cancelled again by the locking element being rotated back into its release position, so that said closing plug can be removed from the drive casing pipe again.

BRIEF DESCRIPTION OF THE DRAWINGS

Further refinements and advantages of the invention are dealt with in the following description which refers to the accompanying drawings in which.

DETAILED DESCRIPTION

Figure 1:
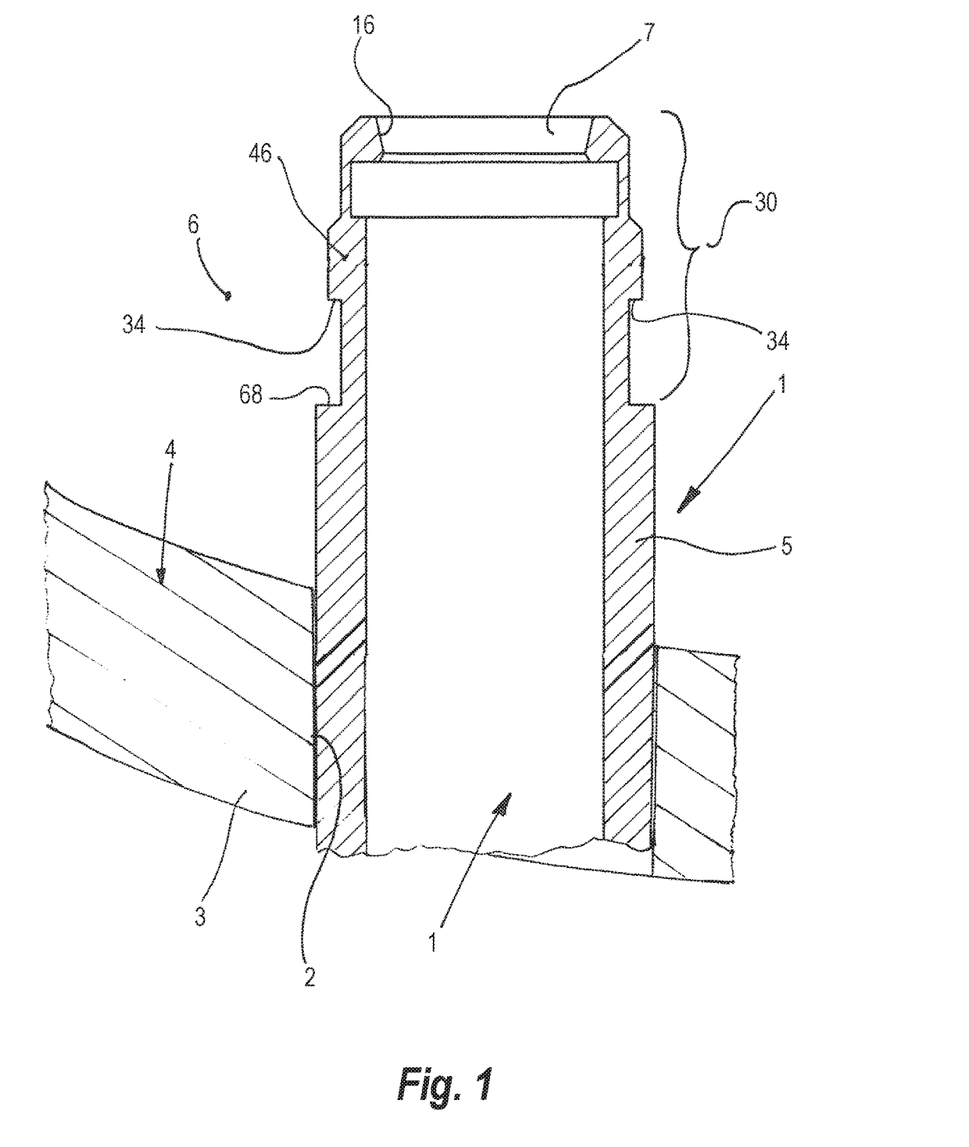
FIG. 1 shows a vertical section through a bottom region of a reactor pressure vessel, through which a drive casing pipe is led with its upper end.

A device of the type according to the invention, which also comprises in addition to a closing plug a tool serving for handling the latter, serves for closing a drive casing pipe 1 which, as shown diagrammatically in FIG. 1, passes through an orifice 2 in the bottom 3 of the reactor pressure vessel 4. The drive casing pipe 1 in this case protrudes with its upper end portion 5 into the inner space 6 of the reactor pressure vessel. The upper pipe orifice 7 of the drive casing pipe 1 is closed by means of the device in question.

Figures 2, 3:
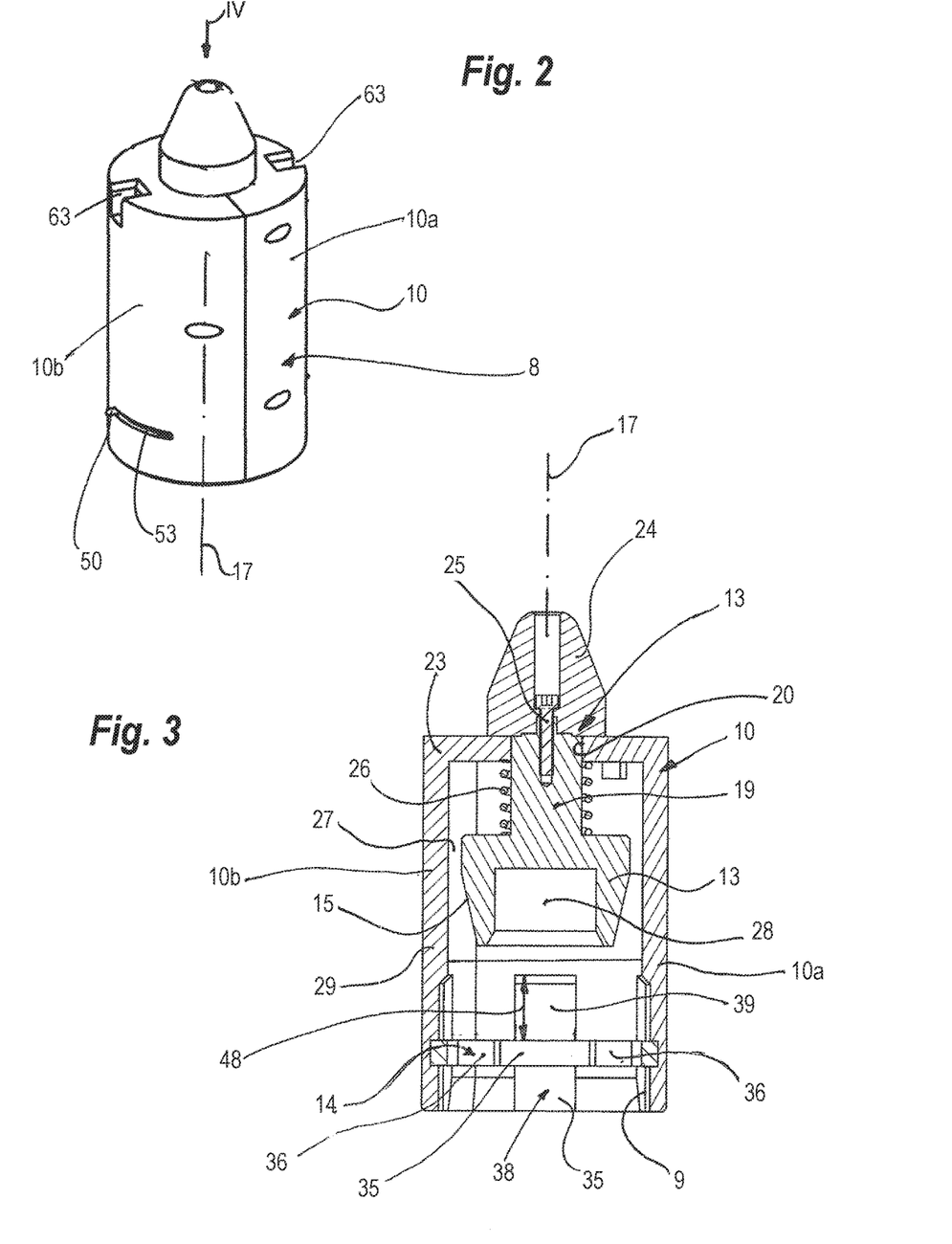
FIG. 2 shows a perspective view of a closing plug.
FIG. 3 shows a longitudinal section according to the line III-III in FIG. 4.
Figures 4, 5, 6:
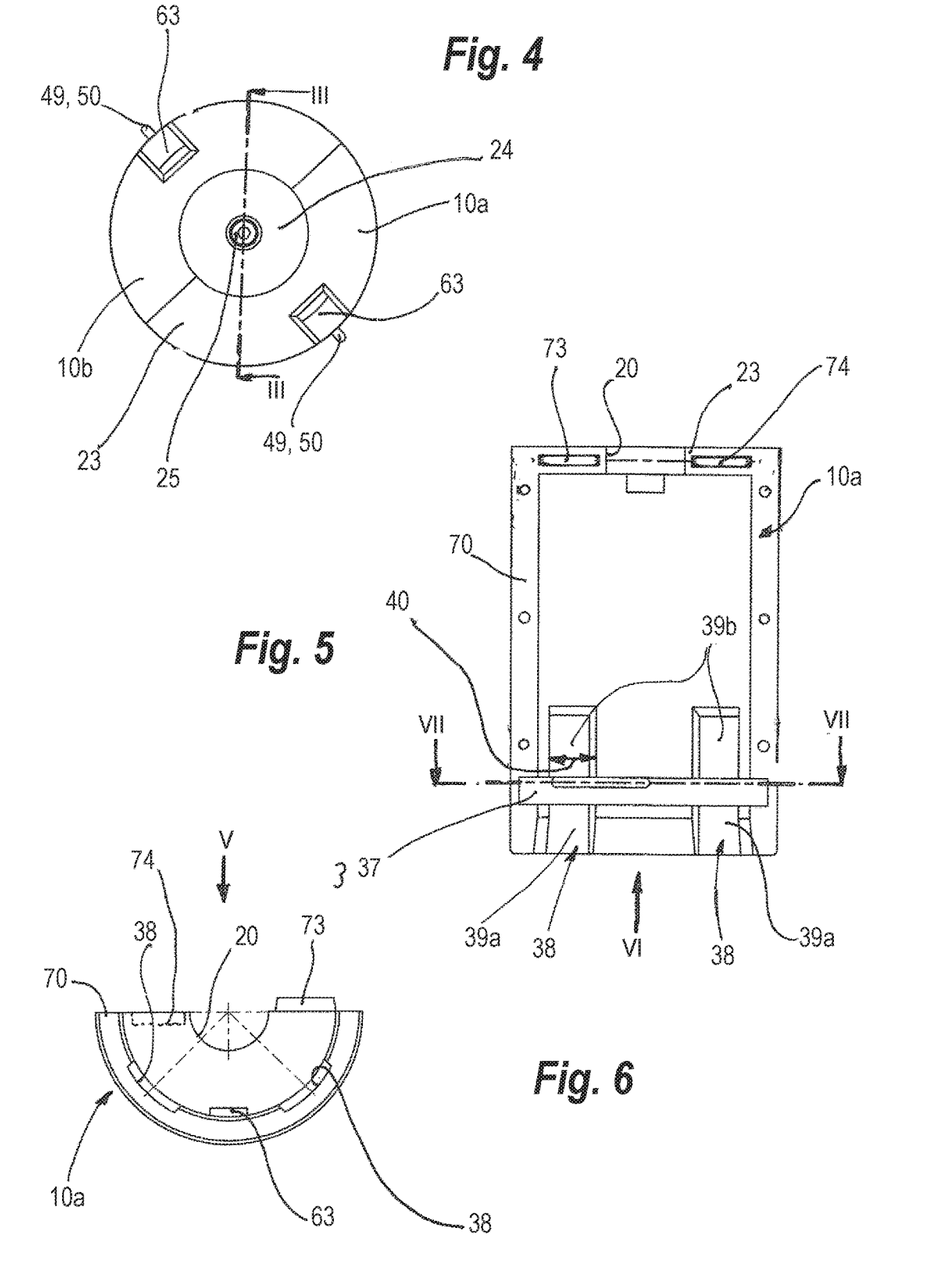
FIG. 4 shows a top view of the top side of the closing plug in the direction of the arrow IV in FIG. 2.
FIG. 5 shows a side view of a part casing of the plug casing in the direction of the arrow V in FIG. 6.
FIG. 6 shows a top view of the underside of the part casing in the direction of the arrow VI in FIG. 5.

The closing plug 8 which serves this purpose and which is shown in FIG. 2 to FIG. 10 comprises a plug casing 10 which is downwardly open, that is to say has an underside orifice 9, a sealing element 13 guided axially movably inside the plug casing 10, and a locking element 14. The sealing element 13 has a sealing surface 15 which is configured such that it can bear sealingly against a countersurface 16 in the pipe end 5, said countersurface bordering the pipe orifice 7. The countersurface 7 is, for example, an upwardly widening conical surface. The sealing surface 15 is correspondingly formed as a downwardly tapering conical surface. The sealing element 13 is mounted on the plug casing 10 movably with respect to the longitudinal mid-axis 17 of the closing plug 8 and is oriented coaxially to the longitudinal mid-axis 17. A guide tenon 19 extending away upwardly and oriented coaxially to the longitudinal mid-axis 17 is arranged on the top side of the sealing element 13 formed approximately as a cone frustum. The upper end of said guide tenon is led with axial movability through an orifice 20 in an upper wall 23 extending transversely to the longitudinal mid-axis 17. The upper end face of the guide tenon 19 is connected, for example with the aid of a screw 25, to a head 24 which is broadened in relation to the diameter of said guide tenon and which bears against the top side of the wall 23 of the plug casing 10. A spring 26 designed, for example, as a helical compression spring is arranged inside the plug casing 10, said spring surrounding the guide tenon coaxially and being supported with its upper end on the plug casing 10, to be precise on the wall 23 of the latter, and with its lower end on the top side of the sealing element 13. The sealing element is thereby prestressed into a lower end position (FIG. 3). The sealing element 13, which has a circular cross-sectional shape, is dimensioned in the radial direction or in a direction extending transversely to the longitudinal mid-axis 17 such that an annular gap 27 is present between said sealing element and the inner wall of the plug casing 10. Furthermore, the sealing element 13 has a downwardly opening central cavity 28. In cases where part of the drive is also present inside the drive casing pipe 1, an upper portion, reaching up to the region of the countersurface 16, of the drive part can be accommodated by the cavity 28, so that the sealing element 13 does not butt against the drive part, since otherwise sealing bearing contact of the sealing surface 15 against the countersurface 16 will be prevented. The plug casing 10 has a cylindrical side wall 29, the inner space bordered by the side wall 29 being dimensioned transversely to the longitudinal mid-axis 17 in such a way that the plug casing 10 can be slipped, free of obstruction, onto the upper pipe portion 5 or onto that pipe portion 30 of the drive casing pipe 1 which downwardly adjoins the pipe orifice 7.

Figures 7, 8, 9:
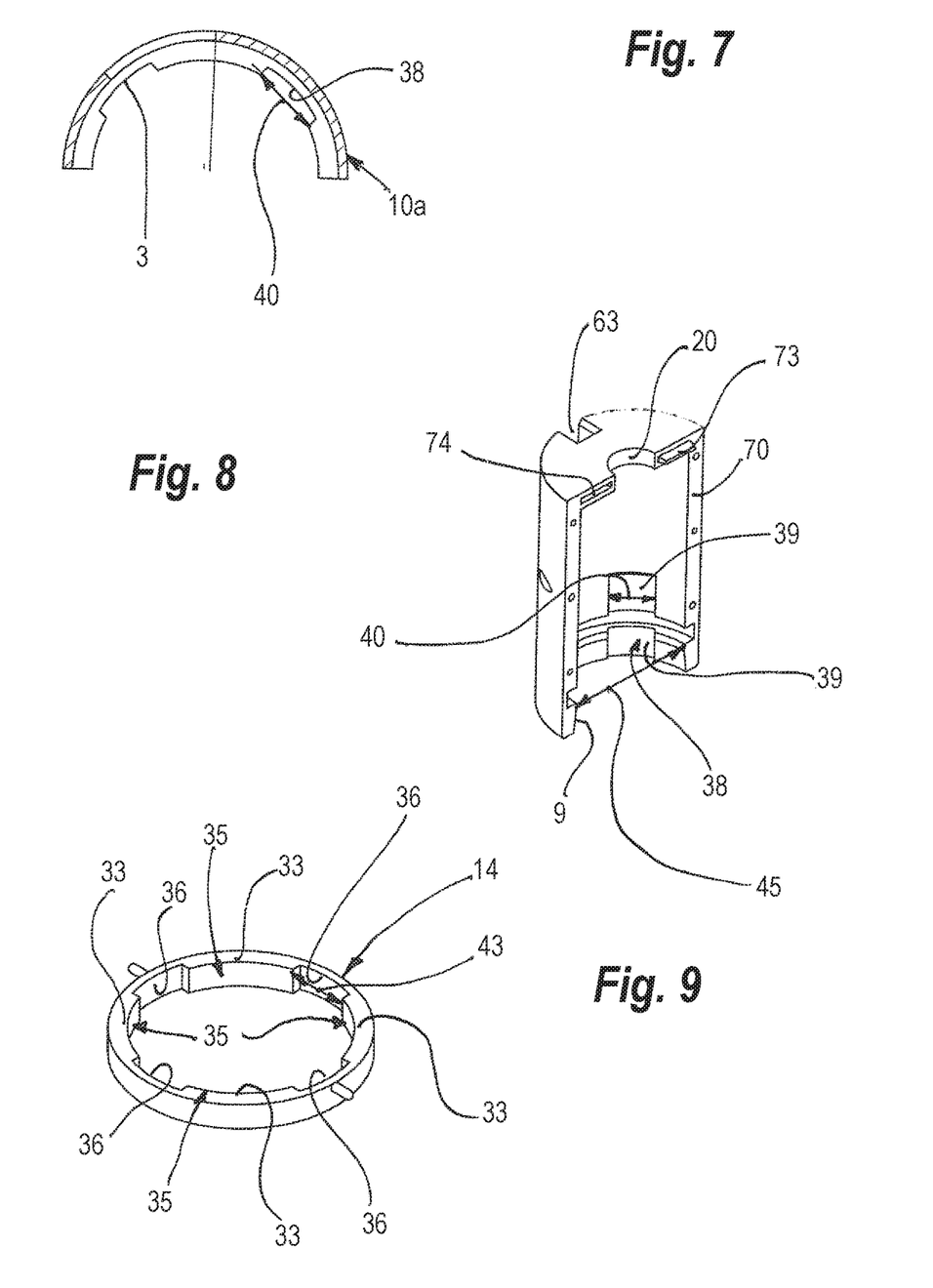
FIG. 7 shows a section according to the line VII-VII in FIG. 5.
FIG. 8 shows a perspective illustration of a part casing.
FIG. 9 shows a locking element in a perspective illustration.
Figure 10:
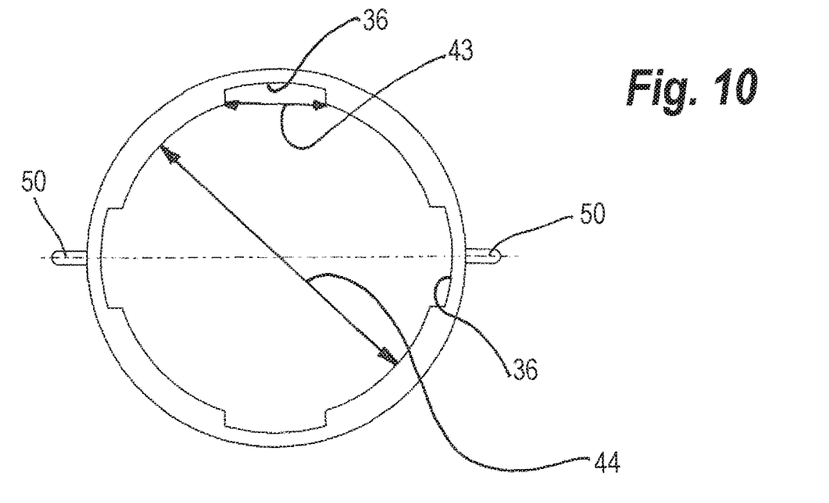
FIG. 10 shows a top view of the locking element of FIG. 9.
Figure 11:
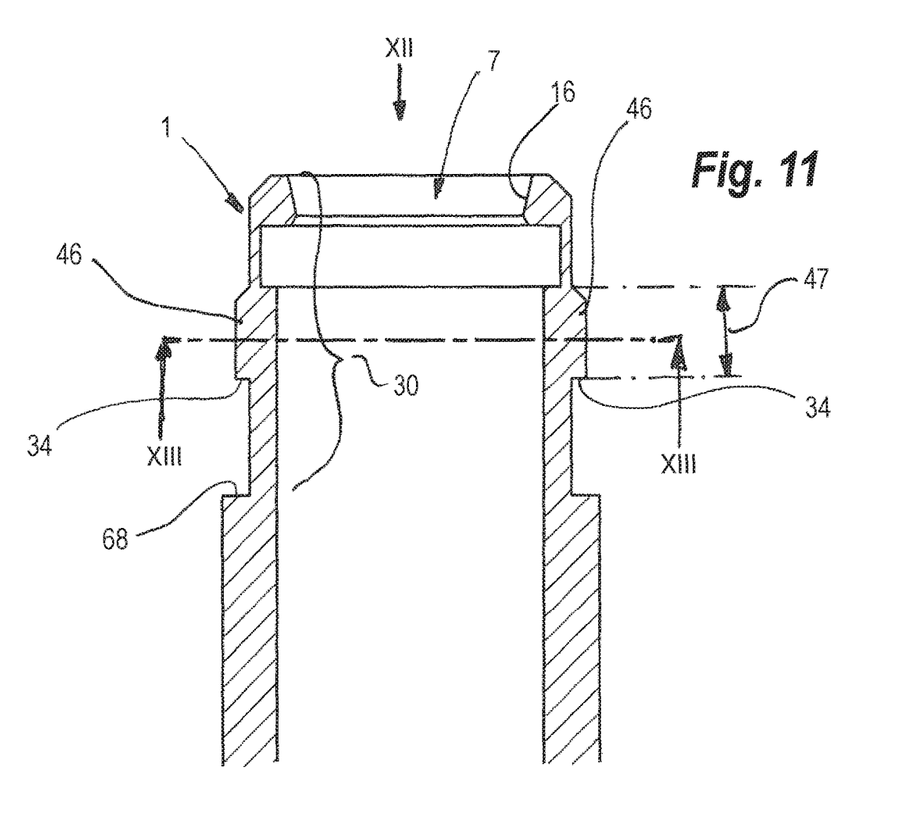
FIG. 11 shows the upper pipe end of a drive casing pipe in a longitudinal sectional illustration.
Figure 12:
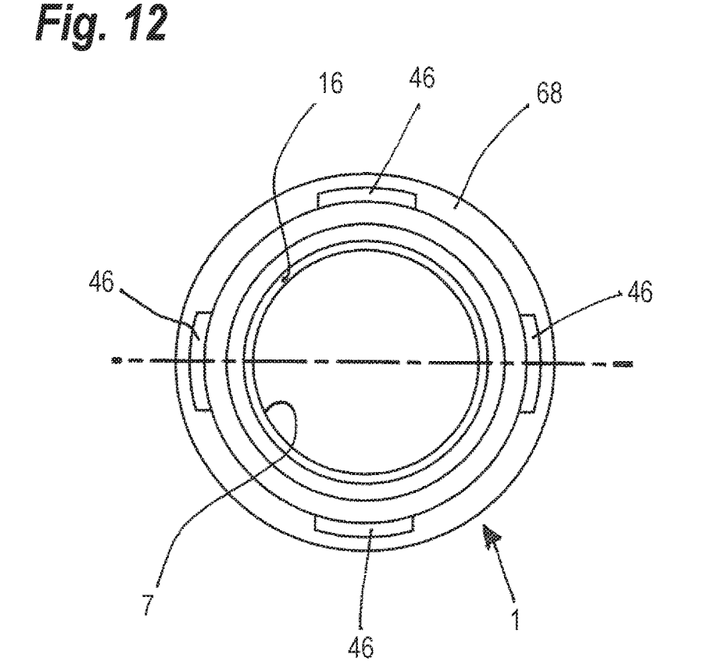
FIG. 12 shows a top view of the drive casing pipe in the direction of the arrow XII in FIG. 11.
Figure 13:
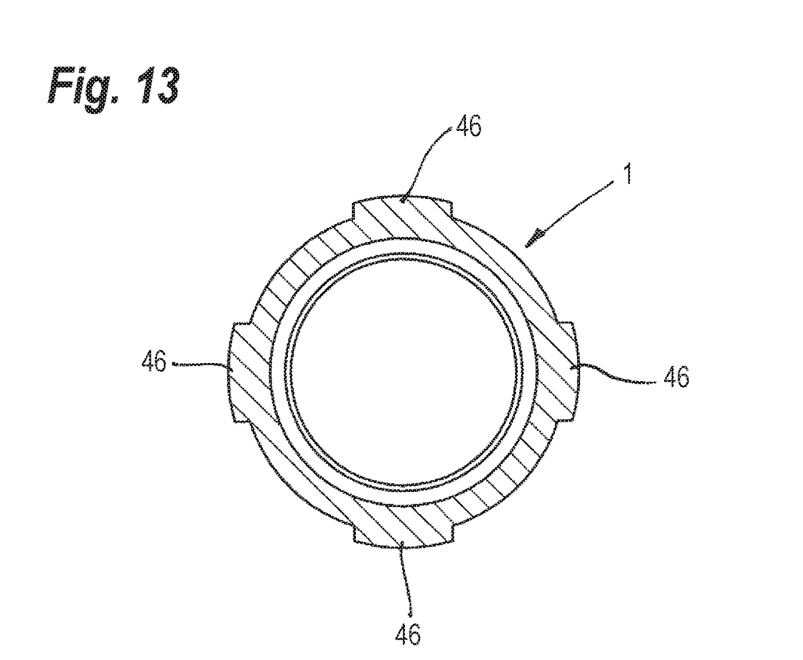
FIG. 13 shows a cross section according to the line XIII-XIII in FIG. 11.

The axial fixing of the closing plug to the upper end portion 5 takes place with the aid of the locking element 14. This is mounted on the plug casing 10 rotatably with respect to the longitudinal mid-axis 17 between a locking position, in which it is axially fixed actively to the drive casing pipe 1, and a release position, in which the axial fixing is cancelled, the longitudinal mid-axis 17 being the axis of rotation. Furthermore, the locking element 14 has at least one radially inward-projecting and upwardly pointing abutment surface 33 which serves for engaging behind a downwardly pointing countersurface 34 on the upper end portion 5 or on the pipe portion 30. More specifically, the locking element 14 is a ring with overall four abutment surfaces 33 in each case lying diametrically opposite one another in pairs, these abutment surfaces forming part of the top side of radially inward-projecting ring segments 35. A recess 36 is present in each case between two ring segments 35 adjacent in the circumferential direction.

For the rotatable mounting on the plug casing, the ring-shaped locking element 14 is seated in an annular groove 37 present in the inner wall of the plug casing 10. Moreover, recesses 38 extending in the axial direction or in the direction of the longitudinal mid-axis 17 are present in the inner wall of the plug casing 10. The recesses 38 extend with subregions 39a, 39b upwardly and downwardly away from the annular groove 37. The width 40 of the recesses 39 corresponds to the width 43 of the recesses 36 present on the locking element 14. The insides, facing one another, of the ring segments 35 run on a cylindrical surface (not illustrated in the figures), the diameter 44 of which corresponds to the diameter 45 of the inner wall of the plug casing 10, the latter diameter being measured in a wall region of the side wall 29 of the plug casing, said wall region directly adjoining the annular groove 37 upwardly and downwardly.

The locking element 14 is held rotatably in the annular groove 37. In a first rotary position, which corresponds to the abovementioned release position, the recesses 36 are congruent with the recesses 38 of the plug casing. In the locking position (FIG. 3), the locking element 14 is rotated with respect to the plug casing 10 such that the ring segments 35 are arranged in the region of the recesses 38 of the plug casing 10. In this position, the ring segments 35 engage behind or overlap with their in each case upwardly pointing abutment surface 33 the countersurfaces 34 on the drive casing pipe 1. The countersurfaces 34 are the lower end faces of ribs 46 which extend in the direction of the longitudinal mid-axis 17 and which project radially outward on the outer circumference of the pipe portion and are spaced apart in the circumferential direction correspondingly to the recesses 36 of the locking element 14. The length 47 of the ribs 46 corresponds to the length 48 of the regions 39b, extending upwardly away from the annular groove 37, of the recesses 38 of the plug casing 10. Thus, in the release position of the locking element 14, the closing plug 8 can be pushed onto the drive casing 1 or onto its pipe portion 30, the ribs 46 engaging into the complementarily configured recesses 38 on the inner wall of the plug casing 10. When the closing plug has reached its end position on the drive casing pipe 1, the ribs 46 are located completely inside the upper regions 39b of the recesses 38, hence do not project into the annular groove 37, so that the locking element can be moved with its radially inward-projecting ring segments 35 under the countersurfaces 34 of the ribs 46.

So that the locking element 14 can be moved into its various positions, at least one rotary actuation element 50, projecting with excess length 49 out of the outer circumference of the plug casing 10, is present. In the exemplary embodiment illustrated in the drawing, two rotary actuation elements 50 are present, which are arranged at diametrically opposite locations on the outside of the ring-shaped locking element 14. The rotary actuation elements 50 project through a long hole 53 extending in the circumferential direction of the plug casing 10 and passing through the side wall 29 of the latter. The long hole 53 has an arc length which corresponds to the rotary adjustment travel of the locking element 14.

Figure 14:
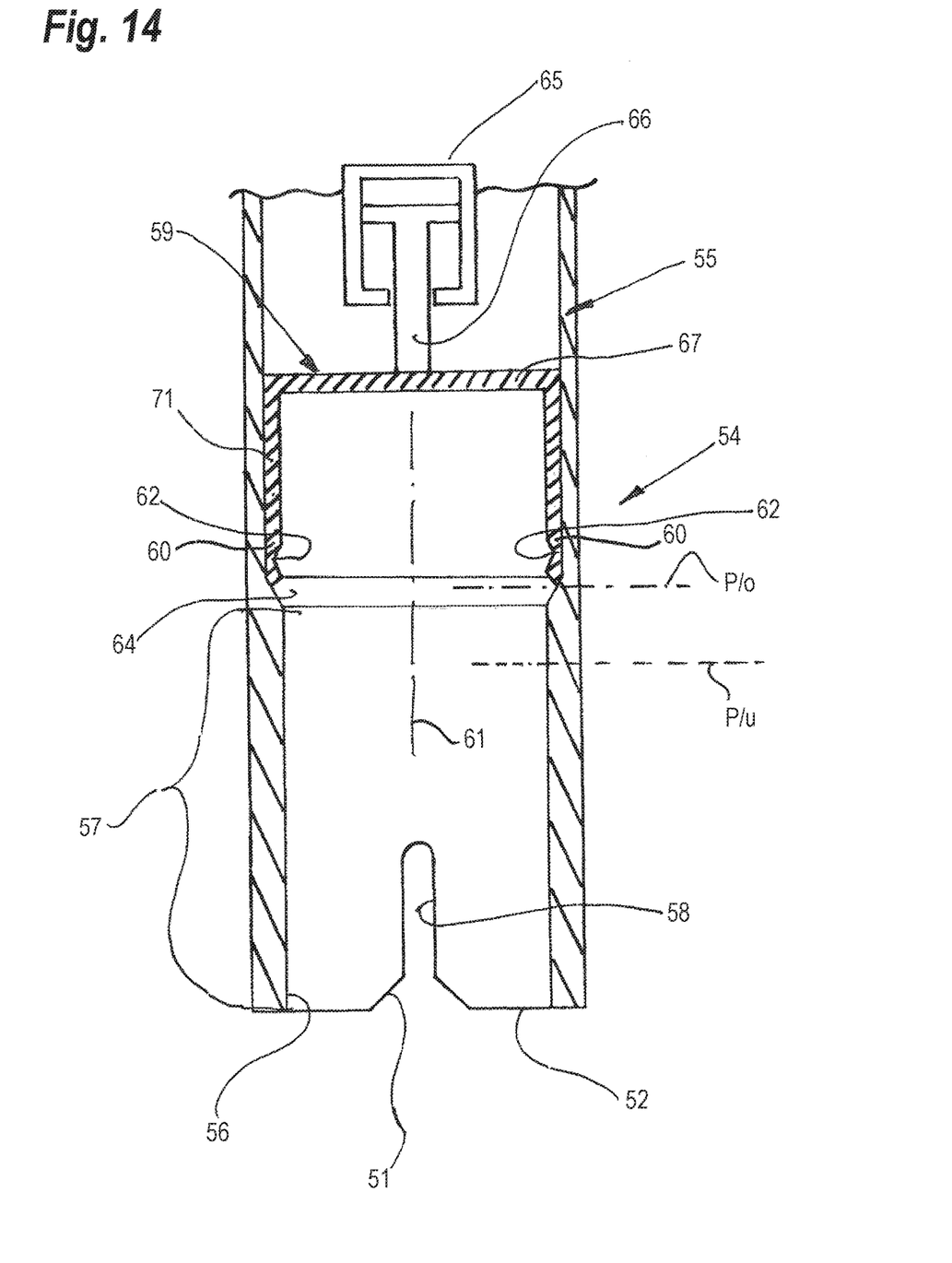
FIG. 14 shows a diagrammatic illustration of the lower end of a tool serving for manipulating a closing plug.

The rotary actuation of the locking element takes place with the aid of a tool 54 which can be fixed to a vertically and horizontally movable mast (not shown), conventional in a power station, and which can be moved axially by means of said mast. The tool 54 comprises a mounting pipe 55 having a lower orifice 56. A pipe portion upwardly adjoining the lower orifice 56 forms a receptacle 57, having a circular inner cross section, for the closing plug 8. Moreover, said pipe portion comprises a coupling element 58 which cooperates with a rotary actuation element 50 for the rotational movement of the locking element 14. In the exemplary embodiment of a tool 54, as illustrated in FIG. 14, the coupling element 58 is an axially extending slot, issuing into the lower end face 52 of the mounting pipe 55, in the inner wall of the receptacle 57, and said slot extends radially outward into the pipe wall of the mounting pipe 55 and may even penetrate through this pipe wall. The transition between the end face 52 and the slot-shaped coupling element 58 is designed in the form of an introduction slope 51. When a plug is being attached to the drive casing pipe 1, the rotary actuation element 50 of the locking element 14 projects into the coupling element 58 designed as a slot or passes through said coupling element.

For the axial fixing of the closing plug 8 inside the mounting pipe 55, a gripper 59 is arranged above the coupling element 58, adjustably between an upper axial position P/o and a lower axial position P/u. The gripper 59, in the upper axial position P/o, fixes the closing plug 8 and, in the lower axial position P/u, releases the latter. To fix the closing plug 8, the gripper 59 has at least one gripping element 60 which, in the lower axial position, cooperates with a fixing recess 63 of the plug casing 10 to make an axially active positive connection. In the lower axial position P/u, the gripping elements 60 project further inward with respect to the longitudinal mid-axis (61) of the mounting pipe 55 than in the upper axial position P/o. Thus, when the gripper 59 is moved axially downward inside the mounting pipe 55, the gripping elements 60 move radially inward and grasp the closing plug 8 in that they engage behind a downwardly pointing surface of the closing plug 8. In the present exemplary embodiment, said surface is formed by the underside of the wall 23 which closes off the closing plug 8 on the top side. The radially inward-directed movement of the gripping elements 60 is brought about with the aid of a projection 64 which projects radially inward from the inner wall of the mounting pipe 55 and which, in the exemplary embodiment according to FIG. 14, is a downwardly tapering conical surface.

For the axial movement of the gripper 59 between the upper and the lower axial position P/o, P/u, a drive 65, for example in the form of a hydraulic cylinder, is arranged inside the mounting pipe 65, above the gripper 59. The downwardly directed piston rod 66 of said hydraulic cylinder is connected to the gripper 59. The latter comprises, for example, a circular baseplate 67, on which two diametrically opposite arms 71 extending away downwardly are arranged marginally. The free ends of said arms form the gripping elements 60, these having a depression 62 on their insides facing one another, in order to improve the gripping properties of the gripper 59.

To close the pipe orifice 7 of a drive casing pipe 1, the tool 54, in the receptacle 57 of which is located a closing plug 8, is lowered into the inner space of the reactor pressure vessel with the aid of the abovementioned mast. The closing plug 8 is held axially in relation to the mounting pipe with the aid of the gripper 59 which is in its lower axial position P/u. The rotary actuation elements 50 project in each case into a slot-shaped coupling element 58. The closing plug 8 is in this case located with respect to the coupling element 58 in a rotary position in which the ring-shaped locking element 14 is in its release position.

The closing plug can thus be pushed with its recesses onto the axially extending ribs 46 of the drive casing 1. In this case, with the spring 26 being compressed axially, the sealing element 13 is pressed with its sealing surface 15 against the countersurface 16 on the drive casing pipe 1. The end position of this push-on movement is reached when the plug casing 10 butts with its lower end face against a radially outward-projecting shoulder 68 of the drive casing 1. The mounting pipe 55 is then rotated about its longitudinal mid-axis 61 and the locking element 14 thereby assumes its locking position. The ring segments 35 then engage with their abutment surfaces 33 behind the countersurfaces 34 of the ribs 46, that is to say the lower end faces of the latter. At the next step, the gripper is moved with the aid of the drive 65 into its upper axial position P/o and the tool 54 is raised with the aid of the mast.

Demounting of the closing plug 8 can be carried out in just as simple a way if the outlined measures for closing the drive casing pipe 1 are carried out in reverse order.

To simplify the mounting of the closing plug 8, the plug casing 10 is subdivided into two part casings 10a, 10b, the parting plane 69 of these running in the direction of the longitudinal mid-axis 17. The part casings are configured as identical parts. On their mounting surfaces (70) lying one against the other in the mounted state, there are connection elements, for example in the form of a projecting tab 73 and of a depression 74, configured complementarily thereto, on the other part casing 10a, 10b in each case.

The invention claimed is:

1. A device for closing an upwardly open pipe orifice of a drive casing pipe receiving a control rod drive of a boiling water reactor, comprising:
   a closing plug having a downwardly open plug casing;
   a sealing element, wherein the sealing element is guided to move axially inside the plug casing and wherein the sealing element has a sealing surface configured to seal bearing contact against a downwardly facing ring-shaped countersurface bordering the pipe orifice;
   a locking element configured to fix the plug casing to the drive casing pipe, wherein the locking element is mounted in the plug casing in a manner that the locking element is configured to rotate with respect to plug casing about a longitudinal mid-axis of the closing plug, between a locking position, in which the locking element is axially fixed to the drive casing pipe, and a release position, in which the locking element is not axially fixed to the drive casing pipe; and
   a spring which is supported with its upper end on the plug casing and with its lower end on the sealing element and which holds the lower end in the seal bearing contact position.

2. The device as claimed in claim 1, wherein the locking element has with respect to the longitudinal mid-axis at least one radially inward-projecting and upwardly pointing abutment surface that is configured to engage behind the downwardly pointing countersurface on the drive casing pipe.

3. The device as claimed in claim 2, further comprising a plurality of the abutment surfaces distributed in a circumferential direction of the plug casing on the locking element.

4. The device as claimed in claim 3, wherein the locking element is a ring, and the abutment surfaces are arranged on radially inward-projecting ring segments.

5. The device as claimed in claim 1, wherein the locking element has at least one rotary actuation element projecting out of an outer circumference of the plug casing.

6. The device as claimed in claim 5, wherein the at least one rotary actuation element passes through an elongated hole, the elongated hole extending:
- in a circumferential direction of the closing plug,
- in a side wall of the plug casing, the side wall extending coaxially to the longitudinal mid-axis of the plug casing.

7. The device as claimed in claim 5, further comprising at least one fixing recess on the plug casing, wherein the at least one fixing recess is configured to cooperate with a gripper.

8. The device as claimed in claim 7, wherein the at least one fixing recess extends: into a top surface of the plug casing and into a side wall of the plug casing.

9. The device as claimed in claim 5, further comprising a tool for handling the closing plug, the tool comprising:
- a mounting pipe having a lower orifice,
- a pipe portion which adjoins the lower orifice forming a receptacle for the closing plug, and
- a coupling element configured to cooperate with the at least one rotary actuation element of the locking element for rotational movement of the locking element.

10. The device as claimed in claim 9, wherein the coupling element is a recess in an inner wall of the mounting pipe and into which the at least one rotary actuation element of the closing plug engages.

11. The device as claimed in claim 10, wherein the coupling element is a slot extending in a longitudinal direction of the mounting pipe.

12. The device as claimed in claim 9, further comprising a gripper inside the mounting pipe above the at least one coupling element, the gripper configured to move between an upper and a lower axial position wherein the gripper in the lower axial position is operably coupled to the closing plug and in the upper axial position is not operably coupled to the closing plug.

13. The device as claimed in claim 12, wherein the gripper has at least one gripping element which, in the lower axial position, is configured to engage into at least one fixing recess of the plug casing to connect to and fix the closing plug axially.

14. The device as claimed in claim 13, wherein the gripper comprises at least one axially downward-projecting flexible gripping element arranged radially further outward with respect to a longitudinal mid-axis of the mounting pipe in the upper axial position than in the lower axial position.

15. The device as claimed in claim 14, wherein the gripping element, in the lower axial position, bears against a projection projecting from an inner wall of the mounting pipe.

16. The device as claimed in claim 1, wherein the plug casing is subdivided into a plurality of part casings, a parting plane of which runs in a direction of the longitudinal mid-axis.

17. The device as claimed in claim 1, wherein the plug casing has a circular contour shape.

* * * * *